Feb. 6, 1951   R. T. EVANS ET AL   2,540,661
COMBINED THRUST BEARING FOR DISK HARROW SHAFTS
Filed Nov. 29, 1947
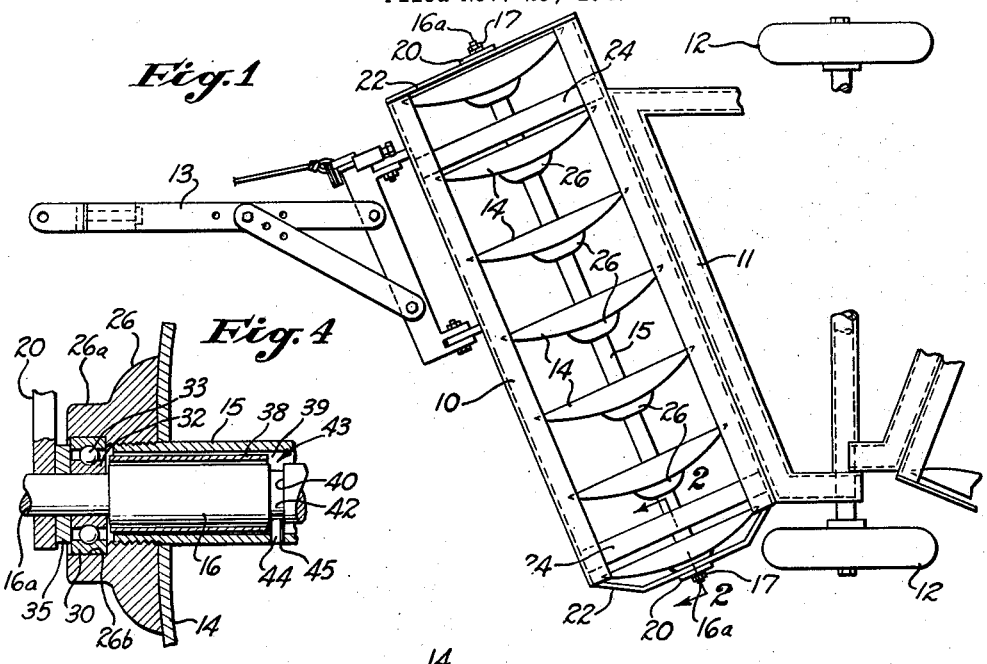
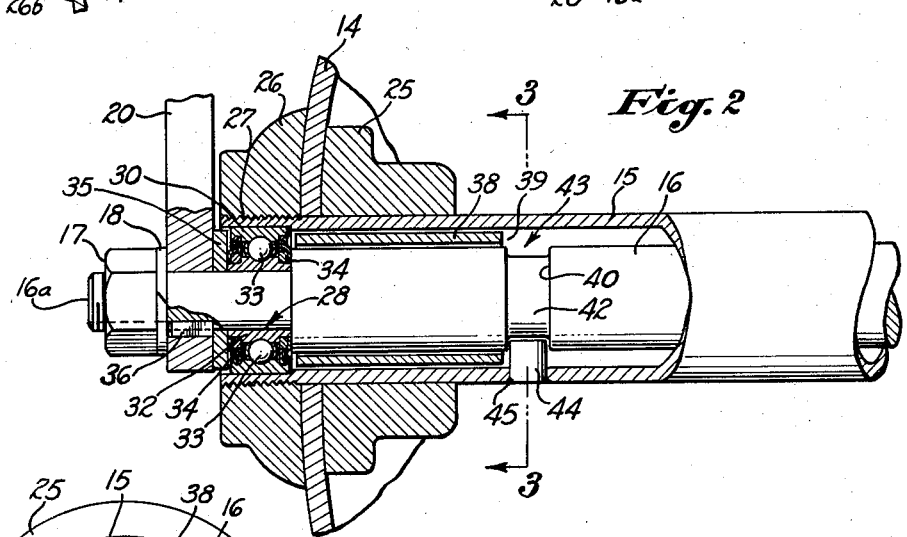
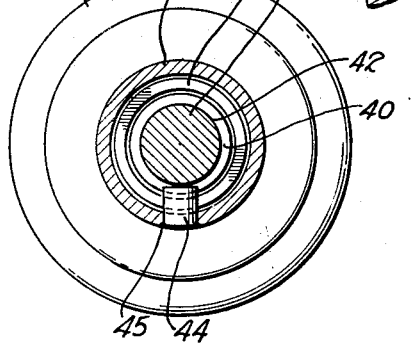
INVENTORS:
RUSSELL T. EVANS
JOHN H. CLASEN
BY THEIR ATTORNEYS
HARRIS, KIECH, FOSTER & HARRIS
By Patented Feb. 6, 1951

2,540,661

UNITED STATES PATENT OFFICE 2,540,661

COMBINED THRUST BEARING FOR DISK HARROW SHAFTS

Russell T. Evans and John H. Clasen, Anaheim, Calif.

Application November 29, 1947, Serial No. 788,896

16 Claims. (Cl. 308—181)

This invention relates to earthworking implements of the type commonly known as disc harrows or disc plows, and more particularly is concerned with bearing structures or mountings for the ends of shafts by means of which the earthworking discs are connected with appropriate framework.

The general purpose of the invention is to provide an improved and unusually efficient construction adapted to serve as bearing and mounting means for disc harrow shafts.

A particular object of the invention is to provide a bearing structure and shaft mounting whereby end thrust upon the shaft will be largely absorbed by a rotating housing which carries the discs, whereby to avoid transmission of such end thrust to ball bearings or the like commonly employed in such mountings, or whereby end thrust tending to be imparted by the housing carrying the discs is in turn transmitted to the shaft more directly rather than through the mentioned ball bearings or similar bearings.

Still another object of the invention is to provide a rugged structure which will accomplish the results indicated, and which will at the same time permit ready assembly of the parts and ready replacement of worn parts.

Another important object is to provide in a structure of the indicated nature an auxiliary bearing means which, in the event that the ball bearings should become destroyed or lost, will serve temporarily as a substitute, friction-type bearing permitting temporary use of the harrow, or transport to a place of repair in the case of a structure without ground wheels. An additional object is to provide such a bearing structure in association with means for automatically pumping lubricant to the bearings during use.

Other objects of the invention, and the various features thereof, will become apparent to those skilled in the art to which the invention pertains upon reference to the following specification and accompanying drawing wherein a preferred embodiment of the invention is illustrated for the purpose of exemplification.

In the drawing:

Fig. 1 is a plan view of a portion of a disc harrow equipped with the improvement of the present invention;

Fig. 2 is an enlarged longitudinal section taken along the axis of the disc-supporting shaft, as indicated by the line 2—2 of Fig. 1;

Fig. 3 is a cross section taken from the line 3—3 of Fig. 2; and

Fig. 4 is a sectional view similar to that of Fig. 2, and it shows a slightly modified form of construction.

In the drawing, a substantially rectangular frame 10 for a gang of discs is shown as being attached to a main frame 11 of the harrow, which main frame may be of any suitable type, but which is in general indicated as having two hinged sections carrying ground wheels 12, the whole structure being adapted to be drawn forward through the medium of a tongue 13 which may be connected with any tractive implement in a conventional manner. A plurality of conventional concavo-convex earthworking discs 14 is shown as being disposed upon a rotating housing 15 mounted through the medium of suitable bearings upon an axle shaft 16 provided with reduced extremities 16a receiving nuts 17 and split lock washers 18 by which the reduced ends 16a are mounted in and carried by the lower ends of depending mounting arms 20. The arms 20 are rigidly secured to end plates 22 of any conventional or appropriate construction provided at the extremities of the disc frame 10 in the general vicinity of cross bars 24. The discs 14, which are mounted about the tubular housing 15, are positioned in any desired or conventional manner, the form illustrated comprising inner hub-like bosses 25 and similar outer bosses 26, which in effect constitute large retaining nuts. These nuts or bosses include an end boss 26 which is attached by threads 27 to the corresponding end of the tubular housing 15, as seen on the end illustrated in Fig. 2, an inside boss 25 preferably being so arranged on the other end (not shown) of the housing 15.

The bearing means by which the tubular housing 15 is rotatably mounted upon the shaft 16 constituting the axle for the gang of discs 14 are illustrated as being ball bearing units 28 disposed between the outer end of the housing 15 and a corresponding section of the reduced ends 16a of the shaft 16. However, it will be appreciated that any appropriate bearing means mounting the respective ends of the housing 15 upon the shaft 16 may be employed. In the specific instance, the ball bearing unit 28 at each end of the housing and shaft assembly comprises an outer ball race 30 forced into the end of the housing 15 and an inner ball race 32 positioned upon the reduced shaft end 16a. These ball races 30 and 32, which are conventionally grooved as indicated, receive balls 33 comprising the usual steel ball bearings of such structures. Conventionally, the outer side of each ball bearing, and preferably both sides thereof, is provided with annular lubricant retaining seals 34 which may include appropriate packing and seal retaining rings approximately as indicated. In the form shown, each ball bearing unit 28 has its inner ball race 32 abutted against the shoulder of the shaft 16 where the reduced end 16a commences, and the opposite side of such inner ball race 32 is abutted by a washer 35 which may additionally serve as sealing means, the washer 35 in turn being bound in position by the respective depending mounting arm 20 under influence of the nut 17 and the split lock washer 18. To insure against rotation of the shaft 16 with respect to the depending arms 20, these parts are shown as being keyed together through the medium of a key 36 and appropriate key slots in the parts as illustrated.

For the purpose of providing an auxiliary bearing to retain the parts generally in operative relationship should the balls 33 or other parts of the ball bearing units 28 fail or be lost, an elongated friction bearing which is shown in the form of a sleeve 38 is positioned adjacent each ball bearing unit 28 between the respective ends of the housing 15 on the shaft 16. This sleeve has considerable thickness and largely fills a corresponding annular space 39 by which the housing 15 and the shaft 16 are spaced from each other. The clearance between the walls of this sleeve 38 and the inner and outer walls, respectively, of the housing 15 and the shaft 16 is small, and proportionately smaller than indicated in Figs. 2 and 3, so that the respective faces may make good bearing surfaces without too much play between them if the bearings 28 break down.

Instead of placing the ball bearing units 28 directly between the ends of the housing 15 and the ends of the shaft 16, each end boss, such as the boss 26 of Fig. 4, may be provided with an extension 26a having a countersunk seat 26b to accommodate a larger ball bearing unit 28 than is possible with the arrangement of Fig. 2. Here, the ends of the housing 15 and the sleeve 38 lie at the side of the bearing unit 28 as illustrated.

Means is also provided for the dual purpose of properly positioning the parts independently of the ball bearing units 28 and their mountings and of taking up end thrust between the housing 15 and the shaft 16 so that it will not be necessary for such end thrust to be taken by the balls 33 in any substantial amount. This is accomplished through the medium of radial shoulders 40 at the ends of a small diameter neck 42 produced by forming an annular groove 43 in the shaft 16 closely adjacent the end of the respective sleeve 38 opposite from the respective ball bearing unit 28. Projecting into the grooves 43 and in operative engagement with the radial shoulders 40 is a cylindrical locking and positioning stud 44 mounted and welded in position in a circular opening in the adjacent wall of the housing 15, as indicated at 45. Such operative fit of the stud 44 in the groove 43 brings the corresponding side portions of the stud 44 into substantial contact with the adjacent wall portions of the radial shoulders 40, the inner end of the stud 44 in each instance being also brought into substantial contact with the corresponding face portion of the neck 42. The engaging side portions of the stud 44 may be slightly flat opposite the shoulders 40 if required. By this construction end movement of the shaft 16 with respect to the stud 44 is substantially eliminated, this movement being limited to the operative thicknesses of the oil film between its sides and the shoulders 40. In this manner, substantially all end thrust between the housing 15 and the shaft 16 which would ordinarily be transmitted through the balls 33 is taken by the stud 44 and the radial shoulders 40, thus relieving the balls and their ball races 30 and 32. In addition to performing the stated function of taking end thrust, the stud 44 also serves as retaining means to limit inward movement of the sleeve 38. Moreover, since the end of the stud 44 in the groove 43 is substantially circular and the sides of the stud 44 cause the curved spaces between the stud 44 and the annular radial shoulders 40 to taper off to the point of contact of said sides with the shoulders 40, rotation of the housing 15 and the stud 44 with respect to the shaft 16 causes the stud 44 to act as a pump for lubricant contained in the annular space 39 between the housing 15 and the shaft 16. The resultant pumping action, which advances the lubricant ahead of the stud 44 as it travels, tend to pump the lubricant into the small bearing spaces between the sleeve 38 and the respective faces of the housing 15 and the shaft 16. Such pumping action has the beneficial effect of urging lubricant from the main lubricant chamber afforded by the annular space 39 in the middle section of the housing 15 to move along the sleeve 38 and toward the ball bearing unit 28 and its operating parts. Since these features of construction are employed at both ends of the housing and shaft assembly, a corresponding mounting and bearing, with its desirable lubricating and bearing advantages, is afforded to the entire assembly.

An important advantage residing in the employment of the stud 44 and its groove 43 at each end of the housing and shaft assembly is the retention of the shaft 16 against longitudinal displacement with respect to the housing 15 should the ball bearing units 28 fail, such result being, of course, effected by engagement of the sides of the respective stud 44 with the respective radial shoulders 40.

In the assembly of the structure shown and described, the studs 44 may be mounted in the housing 15 and welded in place as indicated at 45 as one of the steps in the construction of the housing 15, it being unnecessary to position the studs 44 after the shaft 16 has been placed in the housing 15. This feature results from having the annular space 39 of sufficient thickness or width and the walls of the sleeves 38 of sufficient thickness to accommodate radial movement of the ends of the shaft 16 away from the studs 44 toward the opposite wall of the housing 15 so as to clear the radial shoulders 40 of the annular grooves 43. Thus, with the studs 44 turned to the top of the housing 15, the sleeves 38 and the ball bearing units 28 not having yet been positioned, the shaft 16 may be inserted into the housing 15 until the grooves 43 align with the ends of the studs 44. This, of course, is true of the parts at both ends of the shaft 16 and the housing 15. Such relationship having been attained, each end of the shaft 16 is lifted sufficiently to insert the respective sleeve 38 and place it in the position illustrated in Fig. 2. Thereafter, the respective ball bearing unit 28 is installed as shown in Figs. 2 and 4, and the end of the shaft 16, namely, the reduced end 16a thereof, is inserted in the opening in the lower end of the respective depending mounting arm 20 and the parts bound in operative position through the medium of the nut 17 and the split lock nut washer 18, as illustrated.

It will be obvious that, if any of the respective parts become worn and require replacement, the farmer may readily disassemble them by reversing the described procedure and install new parts. This extends even to the replacement of a shaft 16, which is readily withdrawn after removal of the respective ball bearing units 28 and sleeves 38 by turning the studs 44 to the top so that the axle 16 rests on the bottom of the housing 15 and may be readily drawn axially therefrom.

As has been described hereinbefore, the cooperative effect between the respective studs 44 and the radial annular shoulders 40 takes all substantial end thrust from the balls 33 of the ball bearing units 28, the rotating studs 44 function to produce at least limited movement of lubricant from the lubricant chamber provided by the annular space 39 past the sleeves 38 and toward the ball bearing units 28, and, should the ball bearing units 28 or equivalent construction fail, the interposed sleeves 38 will in each instance serve temporarily as a propriate bearings.

It is to be appreciated that other appropriate bearings than the ball bearing units 28 may be used when suitable, such as the various roller bearings and bearing combinations.

Since many variations of the generic invention herein disclosed will no doubt become apparent to those skilled in the art, it is intended to protect all such modifications as fall within the scope of the claims.

We claim as our invention:

1. A mounting comprising in combination: a shaft; a housing receiving said shaft; means on the ends of said shaft for retaining the same in supporting means; bearing means between said housing and shaft at one end thereof and positioning said shaft and housing in operative relationship with respect to each other and with said shaft spaced from the inner wall of said housing to provide an oil chamber between them, said shaft having an annular groove therein spaced from said one end thereof; a positioning stud secured to said housing and projecting into said groove to resist relative longitudinal movement of said shaft and housing; and a sleeve operatively disposed about said shaft between said groove and said one end of said shaft and movable on said shaft and within said housing, the thickness of said sleeve when so disposed being sufficient to prevent dislodgment of said stud from said groove in the absence of functioning bearing means between the respective ends of said shaft and housing.

2. A combination as in claim 1 wherein the projection of said stud into said groove is less than the thickness of said sleeve.

3. A combination as in claim 2 wherein said positioning stud fits snugly enough in said groove to take end thrust of said shaft.

4. A combination as in claim 1 wherein said positioning stud fits snugly enough in said groove to take end thrust of said shaft.

5. A combination as in claim 1 wherein said bearing means are ball bearings and the positioning stud fits snugly enough in said groove to take end thrust on said shaft from said bearing means.

6. A mounting comprising: a tubular housing; a shaft disposed within said housing for rotation of said housing about the axis of said shaft; means on the ends of said shaft to mount the same in supports therefor; bearing means between end portions of said shaft and housing and positioning the same in operative rotational relationship, said shaft being internally spaced from said housing to provide a chamber between them adapted to receive lubricant; sleeve means disposed between end portions of said shaft and housing adjacent said bearing means, said shaft having an annular groove therein adjacent the inner end of said sleeve means; and a stud secured in said housing and projecting into said groove to lock said shaft against substantial longitudinal shift.

7. A mounting as in claim 6 wherein said sleeve means is rotatable upon said shaft and within said housing, and said stud substantially fills said groove transversely thereof to engage adjacent side walls thereof and serve to pump lubricant to the sleeve means.

8. A mounting as in claim 7 wherein said sleeve means is constructed and disposed to operate as an auxiliary bearing upon loss of said bearing means.

9. A mounting as in claim 6 wherein said sleeve means is constructed and disposed to operate as an auxiliary bearing upon loss of said bearing means.

10. A bearing combination comprising: a shaft; means at an end of said shaft for mounting the same in a support; an object-carrying housing rotatably mounted about said shaft and spaced therefrom to provide an annular chamber; ball-type bearing means supporting the corresponding end of said housing upon said end of said shaft; auxiliary bearing means within said housing and about the end portion of said shaft adjacent said ball-type bearing means to function as a bearing upon loss of the bearing function of said bearing means; and pump means adjacent an end of said auxiliary bearing means remote from said ball-type bearing means to move lubricant from said chamber toward bearing faces of said auxiliary bearing means and toward said ball-type bearing means.

11. A combination as in claim 10 wherein said auxiliary bearing means includes sleeve means rotatable on said shaft and within said housing.

12. A bearing combination comprising: a tubular housing member; a shaft member disposed within said housing member for relative rotation of said housing member about the axis of said shaft member; means on an end of said shaft member to mount the same in a support therefor; principal bearing means adjacent said end of said shaft member between said shaft and housing members and positioning the same in operative rotational relationship, said shaft member being internally spaced from said housing member to provide a chamber between them adapted for receiving lubricant; and auxiliary bearing means within said housing member and about said shaft member at a location adjacent said principal bearing means, one of said members having engaging means at one side thereof projecting toward the other of said members, and the other of said members having annularly disposed engageable means cooperating with said projecting engaging means to hold said shaft member against substantial longitudinal shift, said shaft member being radially movable when said principal and auxiliary bearing means are removed, whereby to remove said projecting engaging means from said engageable means to provide for axial withdrawal of said shaft member from said housing member.

13. A combination as in claim 12 wherein said auxiliary bearing means is a sleeve rotatable on said shaft member and within said housing member.

14. A combination as in claim 13 wherein the projection of said projecting engaging means into engagement with said engageable means is less than the wall thickness of said sleeve.

15. A combination as in claim 12 wherein said engaging and engageable means constitute pump means to move lubricant from said chamber toward said auxiliary bearing means.

16. A combination as in claim 12 wherein said engaging and engageable means are located at one end of said lubricant chamber and adjacent the respective end of said auxiliary bearing means and constitute pump means to move lubricant from said chamber toward said auxiliary bearing means.

RUSSELL T. EVANS.
JOHN H. CLASEN.

REFERENCES CITED

The following references are of record in the file of this patent:

UNITED STATES PATENTS

| Number | Name | Date |
| --- | --- | --- |
| 882,846 | Sachs | Mar. 24, 1908 |
| 1,095,863 | Hess | May 5, 1914 |